J. T. WILSON.
MANUFACTURE OF DRAW-BARS FOR RAILWAY-CARS.

No. 195,736. Patented Oct. 2, 1877.

Witnesses
A. C. Johnston
James J. Johnston

Inventor
John T. Wilson.
By Johnston & Donn.
his attorneys.

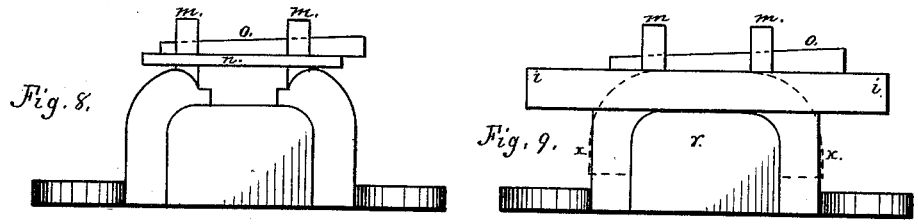
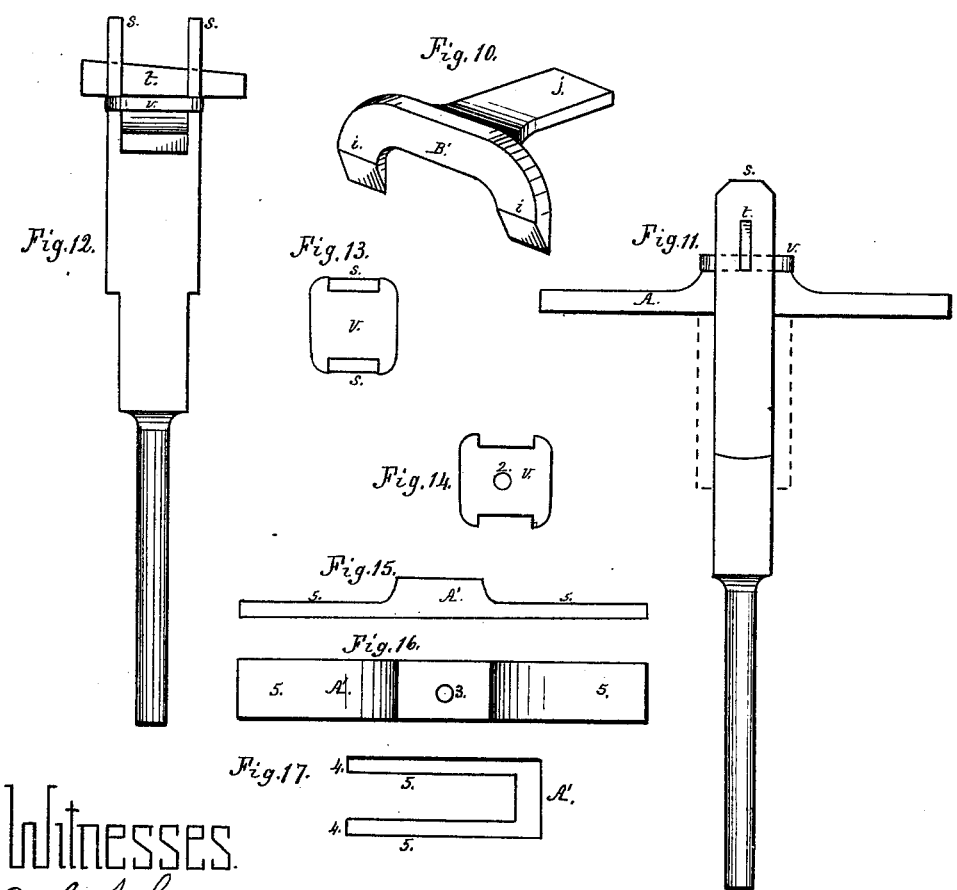

3 Sheets—Sheet 3.

J. T. WILSON.
MANUFACTURE OF DRAW-BARS FOR RAILWAY-CARS.

No. 195,736. Patented Oct. 2, 1877.

Witnesses
A. C. Johnston
James L. Johnston

Inventor
John T. Wilson.
By Johnston & Donn,
his attorneys.

UNITED STATES PATENT OFFICE.

JOHN T. WILSON, OF PITTSBURG, PENNSYLVANIA, ASSIGNOR TO WILSON, WALKER & CO., OF SAME PLACE.

IMPROVEMENT IN THE MANUFACTURE OF DRAW-BARS FOR RAILWAY-CARS.

Specification forming part of Letters Patent No. 195,736, dated October 2, 1877; application filed May 21, 1877.

*To all whom it may concern:*

Be it known that I, JOHN T. WILSON, of Pittsburg, in the county of Allegheny and State of Pennsylvania, have invented a new and useful Improvement in the Construction of Draw-Bars or Couplings for Railway-Cars; and I do hereby declare that the following is a full and exact description thereof, reference being had to the accompanying drawings, and to the letters of reference marked thereon.

My invention relates to the construction of draw-bars or couplings for railway-cars; and consists in the method hereinafter described, whereby the coupling is made in one piece by forming and bending several parts of it, and uniting them together through the medium of a series of forging, bending, and welding dies.

To enable others skilled in the art to make and use my invention, I will proceed to describe its construction and operation.

Figure 1:
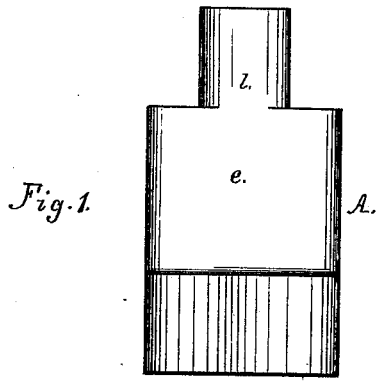
Figure 2:
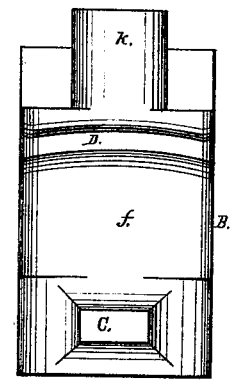
Figure 3:
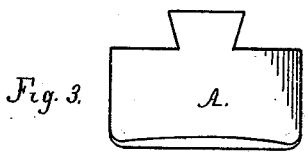
Figure 4:
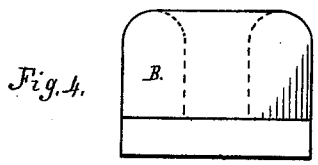

In the accompanying drawings, which form part of my specification, Figures 1 and 2 represent face views of the first set of dies. Figs. 3 and 4 are end views of the same.

In the drawings, A represents the upper die, and B the lower die, with forging-faces $e f$, the latter being furnished with an opening, C, and groove D, A being the moving die and B the stationary die, which dies may be arranged in any suitable forging-machine.

Figure 5:
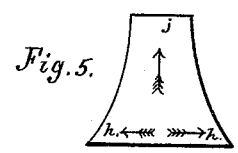

The iron for forming a portion of the front part of the draw-bar or coupling is cut in the form represented in Fig. 5, the plate or bar from which it is cut being made from a "pile," so arranged that the fiber will run in the direction indicated by the arrows in Fig. 5. The piece shown in Fig. 5 is then heated to the proper degree, and the part $j$ is placed in the opening C of the lower die B. The upper die A, striking down on the part marked $h h$, forces it out right and left. The heated iron is then removed from the opening C and placed upon the face $f$ of the die B, and the face $e$ of the die A brought down upon it for the purpose of truing it up. It is again placed in the opening C and subjected to several strokes from the die A, which will bring it partially into the form represented in Fig. 6.

Figure 6:
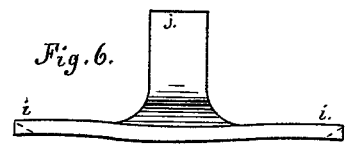

The parts $i i$ are further drawn out by placing them alternately upon the part $k$ of the die B, and subjecting them to the action of the part $l$ of the die A. The part $j$ of the piece represented in Fig. 6 is placed upon the face $f$ of the die B, with the parts $i i$ placed in the groove D of the die B, in which case the part $j$ will point toward the opening C in the die B. The heated piece is then subjected to a series of strokes from the die A. By thus subjecting the heated piece represented in Fig. 5 to the manipulations and actions of the dies, substantially as before described, the piece represented in Fig. 6 will be formed.

Figure 7:
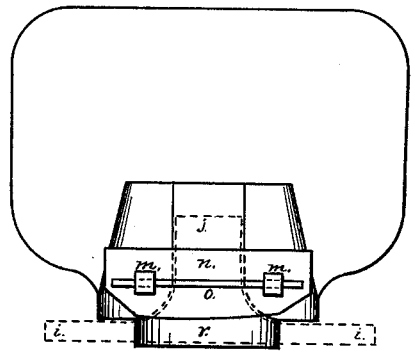

Fig. 7 represents a top view of the die used for bending the piece represented in Fig. 6. Fig. 8 is a front elevation of the same. Fig. 9 is a front view of the same, with the piece represented in Fig. 6 secured in position for bending it into the form represented in Fig. 10.

The dotted lines $x$ in Fig. 9 represent the parts $i i$ of the piece shown in Fig. 6 bent around the form $r$ of the bending-die shown in Figs. 7, 8, and 9, which bending-dies are furnished with two vertical standards, $m m$, having slots for a key, $o$, used for the purpose of holding the plate $n$ down on the piece (shown in Fig. 6) placed on said bending-die while the parts $i i$ are being bent into the form shown in Fig. 10. The parts $i i$ are bent into the form shown in Fig. 10 by means of the hammering or sledging process, but a counter-die may be employed for that purpose.

The position of the piece shown in Fig. 6 in the bending-die, prior to the bending of the parts $i i$ over the part $r$ of said die, is clearly shown in Figs. 7 and 8. Two pieces of the form shown in Fig. 10 are made by the means hereinbefore described.

Fig. 11 is a side view of a bending-die for bending the piece represented in Figs. 15 and 16 into the form shown in Fig. 17. Fig. 12 is a front view of said bending-die. Fig. 13 is an end view of the same.

The said bending-die has two projecting arms, $s s$, which are provided with slots for the key $t$, which holds the plate $v$ down on the piece A′, as shown in Figs. 11 and 12. The plate $v$ is provided with a projecting pin, 2, which enters a recess, 3, in the piece A′, by which means, in connection with the key $t$, the piece A′ is held in a fixed position in the bending-die while it is being bent into the form shown in Fig. 17, and is indicated by the dotted lines in Fig. 11. The piece A' is formed by means of a pair of rolls, the form and construction of which will be readily understood by the skillful roller and roll turner.

After the piece A' is bent into the form shown in Fig. 17, the limbs 5 5 (shown in Figs. 15 and 16) are bent into the form shown in Fig. 17, by means of the hammering or sledging process, but a counter-die may be employed for that purpose.

Figure 20:
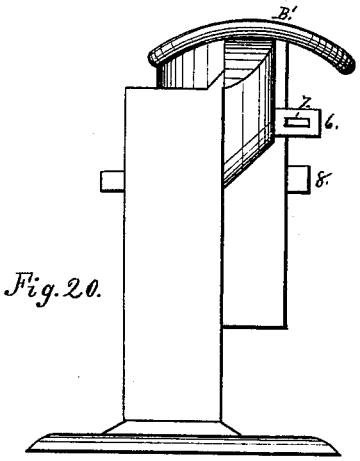
Figure 21:
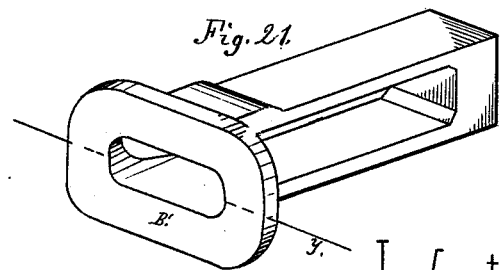

The end 4 of one of the limbs 5 is heated to the degree for welding, and the end of the piece $j$ of the piece represented in Fig. 10 is also heated to the welding degree, and is then welded to the limb 5, and in like manner is another piece, such as is shown in Fig. 10, welded to the other limb 5 of the piece shown in Fig. 17, which will form the draw-bar or coupling shown in Fig. 21, excepting that the face-plate or buffer-head B' will be in two parts, separated at line $y$, which are subsequently heated and welded together while being held in the welding-die. (Shown in Figs. 18, 19, and 20.)

Figure 18:
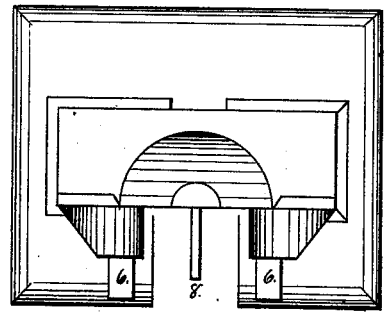
Figure 19:
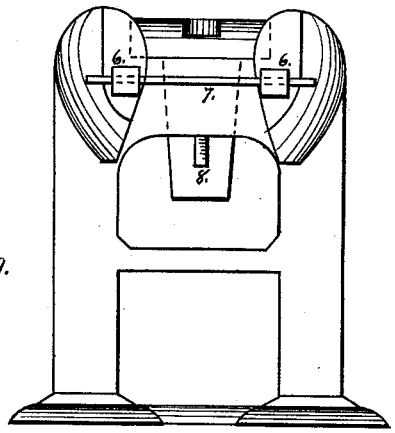

Fig. 18 represents a top view or plan of the welding-die. Fig. 19 is a front elevation of the same. Fig. 20 is a side elevation of the same, representing the draw-bar held in position for welding together the face-plate B'. The welding-die has two slotted arms, 6, and keys 7 and 8, for holding the draw-bar or coupling in a fixed position on the welding-die while the face-plate is being welded together. The position of the keys 7 and 8 with relation to the die and draw-bar is clearly shown in Figs. 19 and 20.

By constructing the draw-bar or coupling shown in Fig. 21 in the manner and by means of the dies hereinbefore described, it can be made of wrought-iron or forging-steel (semi-steel) with great facility and saving of labor.

Having thus described my improvement, what I claim as of my invention is—

1. As an improvement in the art of making draw-bars for railway-cars, such as shown in Fig. 21, forging and bending the blanks shown in Figs. 5 and 15 into the forms shown in Figs. 10 and 17, respectively, welding one of the blanks shown in Fig. 10 to each arm of the blank shown in Fig. 17, and, finally, closing the face-plate by welding, all substantially as hereinbefore described.

2. A series of dies, substantially as shown and described, for making draw-bars for railway-cars, viz., the dies A and B, and the dies shown in Figs. 7, 11, and 18 of the drawings.

JOHN T. WILSON.

Witnesses:
JAMES J. JOHNSTON,
A. C. JOHNSTON.